UNITED STATES PATENT OFFICE.

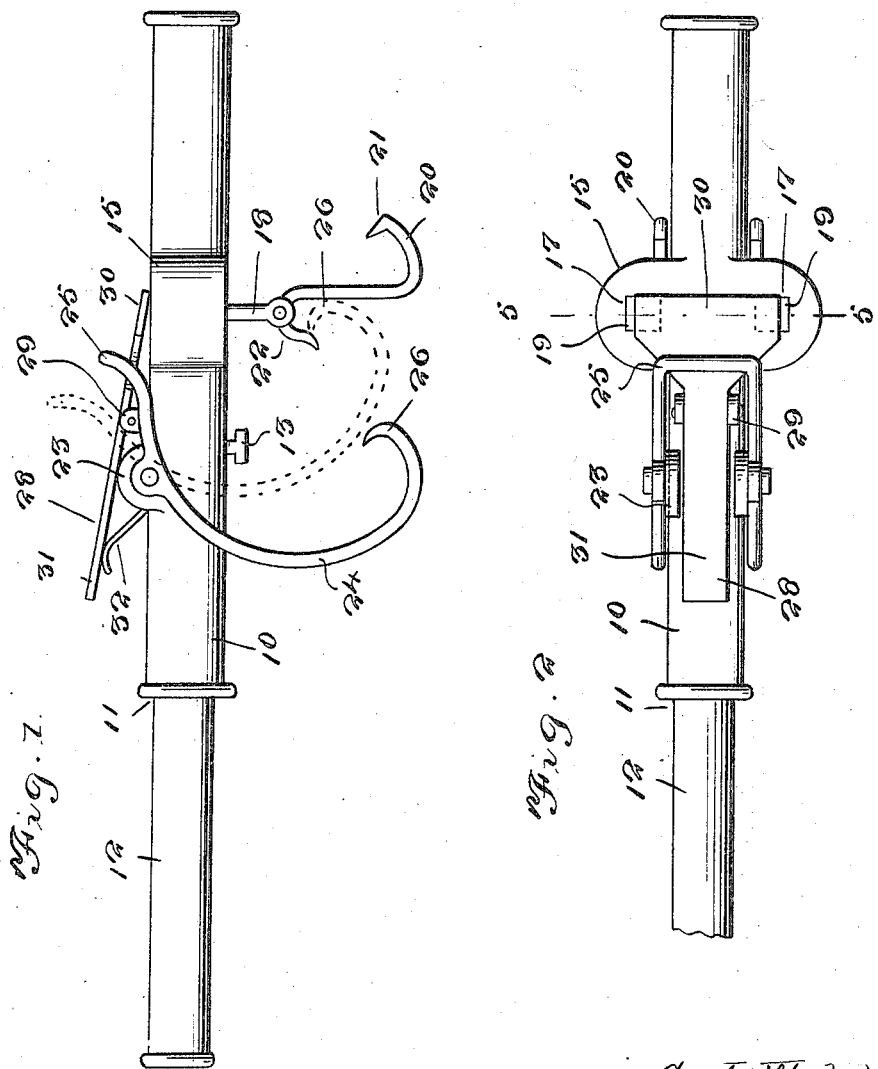

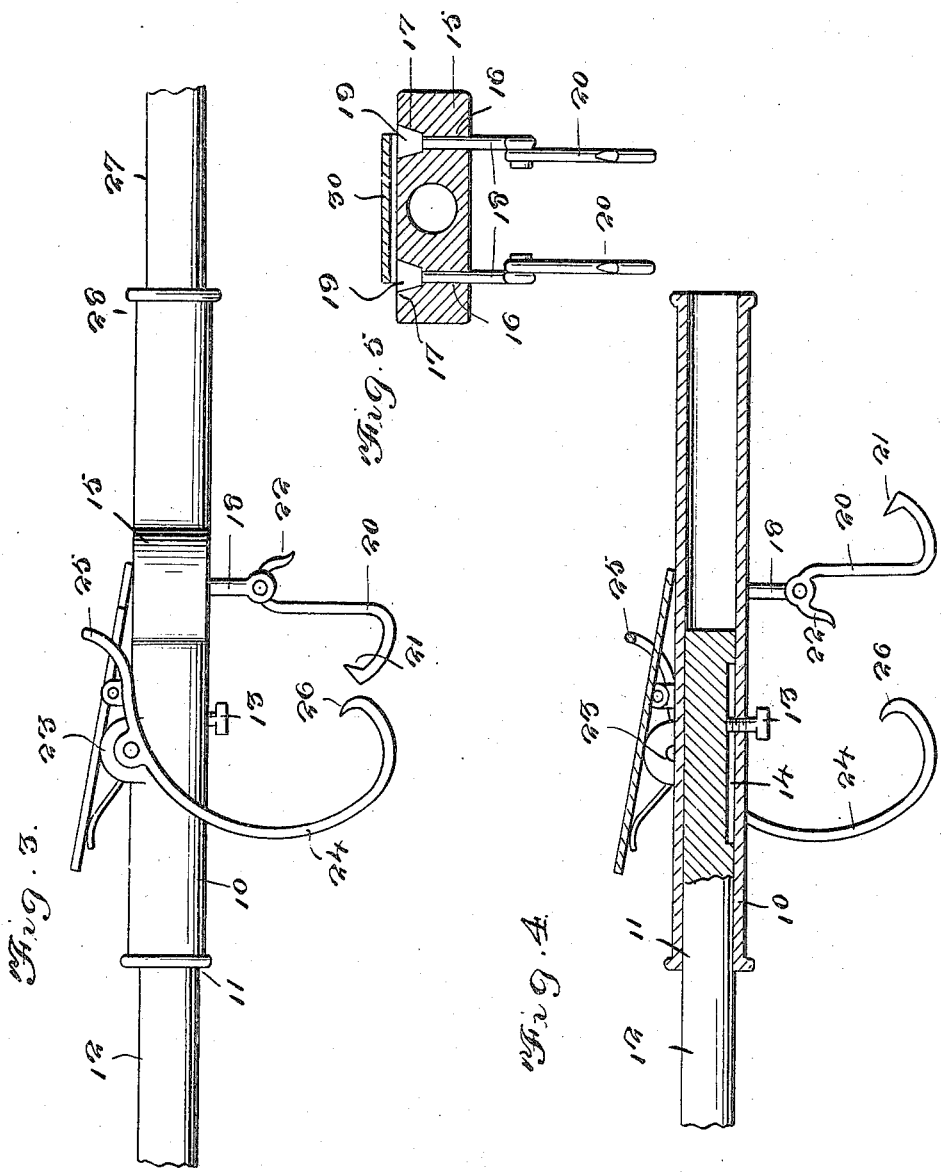

CHARLES J. WOLD, OF GRANTSBURG, WISCONSIN.

CANT-HOOK AND CARRIER.

1,390,185.    Specification of Letters Patent.    Patented Sept. 6, 1921.

Application filed August 3, 1920. Serial No. 400,942.

*To all whom it may concern:*

Be it known that I, CHARLES J. WOLD, a citizen of the United States, residing at Grantsburg, in the county of Burnett and State of Wisconsin, have invented new and useful Improvements in Cant-Hooks and Carriers, of which the following is a specification.

This invention relates to cant hooks and aims to provide a tool of this character which in addition to its use in handling logs may be used in lifting and carrying timber, ice, etc.

Other objects and advantages of the invention will appear as the following description is read in connection with the accompanying drawings.

In the drawings:

Figure 1 is a side elevation of a cant hook embodying the present invention.

Fig. 2 is a top plan view of the same.

Fig. 3 is a view similar to Fig. 1 showing the main cant hooks in reverse position.

Fig. 4 is a longitudinal section.

Fig. 5 is a transverse section on the line 5—5 of Fig. 2.

Referring in detail to the drawings, wherein like characters of reference denote corresponding parts, the invention comprises a body member 10 which is provided at one end with a socket 11 for the reception of a removable handle 12. This handle is held in position by means of a set screw 13 which enters the socket and engages a groove 14 provided in the handle 12.

The body member 10 is enlarged at the point indicated at 15 and extending transversely through said body member at this point are spaced openings 16, the upper ends of which are provided with rectangular tapered sockets 17. The openings 16 are designed to receive shanks 18, one end of which carries rectangular tapered heads 19 for engagement with the socket 17. The opposite ends of the shanks have pivotally secured thereto the main cant hooks 20 which are provided with the usual engaging bills 21. The opposite ends of the hooks 20 are provided with extensions 22.

Pivotally mounted upon ears 23 carried by the body member 10 are hooks 24, the inner ends of these hooks being connected as shown at 25 so as to provide a handle or bail for the position of the hooks. The bills 26 of the hooks 24 may be engaged with the extension 22 of the hooks 20 to hold the latter in open position.

The purpose of mounting the hooks 20 in the manner shown and described is to permit of their reversal to the position shown in Fig. 3 so as to coöperate with the hooks 24 for lifting timber, ice and other articles. When used in this manner the tool is provided with an additional handle 27 which engages a socket 28 provided in the end of the body member opposite the socket 11.

In order to reverse the hooks 20 it is necessary to slide the shanks 18 longitudinally within the openings 16 and to then rotate them and for the purpose of holding the shanks against accidental sliding movement there is provided a lever 28 which is pivotally mounted upon the body member as shown at 29. One end of this lever is formed with a relatively wide end 30 which engages the heads 19 of the shanks 18 while its opposite end is formed into a handle 31 beneath which is positioned a spring 32 to yieldingly hold the end 30 in its engagement.

When the tool is arranged as shown in Fig. 1 it may be used after the manner of the ordinary cant hook, but by reversing the hooks 20 and inserting the handle 27 it provides an effective tool for use as a carrier.

The invention is susceptible of various changes in its form, proportions and minor details of construction and the right is herein reserved to make such changes as properly fall within the scope of the appended claims.

Having described the invention what is claimed is:—

1. A cant hook comprising a body member, a removable handle for said member, a pair of hooks pivotally mounted upon the body member and connected pivotally mounted hooks also carried by the body member for engagement with the first mentioned hooks for holding the latter in open position.

2. A cant hook comprising a body member, a removable handle for said member, a pair of hooks pivotally mounted upon the body member, a second pair of hooks also pivotally mounted upon the body member and spaced from the first mentioned hooks and means whereby the first mentioned hooks may be reversed and arranged in opposed relation with the second mounted hooks.

3. A cant hook comprising a body member, a removable handle for said member, a pair of spaced shanks disposed transversely of said member and capable of rotation therein, means for holding the shanks against rotation, hooks carried by the shanks and a second pair of hooks also pivotally mounted upon the body member and spaced from the first mentioned hooks.

4. A cant hook comprising a body member, a removable handle for said member, a pair of spaced shanks disposed transversely of said member and capable of sliding movement therein to permit of their rotation, spring actuated means for holding the shanks against sliding movement, hooks carried by the shanks and a second pair of hooks also pivotally mounted upon the body member and spaced from the first mentioned hooks.

5. A cant hook comprising a body member, a removable handle for said member, a pair of spaced shanks disposed transversely of said member and capable of sliding movement therein to permit of their rotation, a spring actuated lever engageable with the shanks for holding them against sliding movement, hooks carried by the shanks and a second pair of hooks also pivotally mounted upon the body member and spaced from the first mentioned hooks.

In testimony whereof I affix my signature.

CHARLES J. WOLD.